US005518600A

United States Patent [19]

Uchinami

[11] Patent Number: 5,518,600

[45] Date of Patent: May 21, 1996

[54] OXYGEN CONCENTRATION DETECTION APPARATUS

[75] Inventor: Masanobu Uchinami, Himeji, Japan

[73] Assignee: Mitsubishi Denki Kabushiki Kaisha, Tokyo, Japan

[21] Appl. No.: 360,451

[22] Filed: Dec. 21, 1994

[30] Foreign Application Priority Data

Dec. 28, 1993 [JP] Japan .................................... 5-336556

[51] Int. Cl.[6] .......................... G01N 27/41; G01N 27/409

[52] U.S. Cl. .......................... 204/401; 204/410; 204/425; 204/426; 204/427

[58] Field of Search ...................... 204/153.18, 421–429, 204/401

[56] References Cited

U.S. PATENT DOCUMENTS

| | | | |
|---|---|---|---|
| 4,430,191 | 2/1984 | Sone et al. | 204/401 |
| 4,464,244 | 8/1984 | Uchida et al. | 204/424 |
| 4,500,412 | 2/1985 | Takhashi et al. | 204/425 |
| 4,698,209 | 10/1987 | Hashimoto et al. | 204/425 |
| 4,715,343 | 12/1987 | Kinoshita | 204/425 |
| 4,808,269 | 2/1989 | Kawanabe et al. | 204/425 |
| 4,860,712 | 8/1989 | Nakajima et al. | 204/425 |
| 4,895,123 | 1/1990 | Uchinami | 123/489 |
| 4,911,130 | 3/1990 | Takahashi et al. | 123/489 |
| 4,915,077 | 4/1990 | Uchinami et al. | 123/440 |
| 4,938,196 | 7/1990 | Hoshi et al. | 204/425 |
| 4,958,611 | 9/1990 | Uchinami et al. | 204/401 |
| 5,011,590 | 4/1991 | Nakajima et al. | 204/425 |

FOREIGN PATENT DOCUMENTS 203950 9/1987 Japan .

*Primary Examiner*—T. Tung
*Attorney, Agent, or Firm*—Sughrue, Mion, Zinn, Macpeak & Seas

[57] ABSTRACT

An oxygen concentration detection apparatus for an internal combustion engine is capable of starting feedback control of an air-fuel ratio in the shortest time possible after the engine has been started, thereby preventing the blackening of an oxygen concentration sensor 1, incorrect determination of the air-fuel ratio immediately after start of the current supply to a heating element 20, and damage to the oxygen concentration sensor 1 due to a temperature rise of the heating element 20 when the engine is cold started. A heating state of the heating element 20 of a variable resistance type, which heats the oxygen concentration sensor 1, is detected so that the current supply to an oxygen pumping device 18 is controlled in accordance with the detected state of the heating element 20.

7 Claims, 5 Drawing Sheets

OXYGEN CONCENTRATION DETECTION APPARATUS

BACKGROUND OF THE INVENTION

1. Field of the Invention

The present invention relates to an oxygen concentration detection apparatus for detecting the oxygen concentration in the exhaust gas discharged from an internal combustion engine.

2. Description of the Related Art

As means for purifying exhaust gas of the engine, improving fuel economy and the like, there is known an air-fuel ratio controller which detects the oxygen concentration in the exhaust gas and controls in a feedback manner the air-fuel ratio of a mixture, which is supplied to the engine, to a required air-fuel ratio in accordance with the detected oxygen concentration level. In an oxygen concentration detection apparatus used in such a air-fuel ratio controller, as disclosed, for example, in Japanese Patent Laid-Open No. 58-1531, there is known an oxygen concentration detection apparatus which generates an output in proportion to the oxygen concentration in the exhaust gas in a region where the air-fuel ratio of a mixture supplied to the engine is greater than a stoichiometric air-fuel ratio. As disclosed in Japanese Patent Laid-Open No. 62-76446, there is known a controller for such an oxygen concentration detection apparatus in which the current supply to an oxygen pumping device is delayed by a predetermined length of time from the start of current supply to prevent blackening of the oxygen concentration detection apparatus and incorrect detections due to a delayed response of a heating element which heats the oxygen pumping device. The term "blackening" means that oxygen ions are removed from the solid electrolytic member. There is also known an oxygen concentration detection apparatus, as disclosed in Japanese Patent Laid-Open No. 62-203950, in which after the engine has been started, the current supplied to the heating element is decreased until a predetermined time has elapsed to prevent thermal shock which would otherwise result from a sudden heating of the oxygen pumping device and might damage the oxygen concentration detection apparatus.

In the aforementioned conventional oxygen concentration detection apparatus, the predetermined length of time is generally set to be longer than the required time for ordinary conditions of use (for example, at the outside air temperature of 20 degrees or thereabout) to prevent problems from occurring even when the most unfavorable air temperature condition for automobile use (for example, when starting the engine at an outside air temperature of –40 degrees) occurs.

For this reason, under ordinary conditions of use, in the conventional oxygen concentration detection apparatus, even when feedback control can be performed after current supply to the oxygen pumping device has been started, current cannot be supplied to the oxygen pumping device until the aforementioned predetermined length of time has elapsed. Therefore, during the predetermined length of time, since the ratio of the air-fuel mixture cannot be controlled by a feedback control method, it is controlled by an open loop control method.

In addition, under ordinary conditions of use, in the conventional oxygen concentration detection apparatuses, even when current can be supplied to the heating element without decreasing the magnitude of current supplied after the engine has been started, feedback control cannot be performed until the predetermined length of time has elapsed. Therefore, during this length of time, the ratio of the air-fuel mixture is controlled by the open loop control method.

Further, in the conventional oxygen concentration detection apparatus, optimal air-fuel ratio control cannot be started every time in the shortest period of time, which gives rise to such problems as insufficient purification of the exhaust gas and reduced fuel economy.

SUMMARY OF THE INVENTION

In view of the above-described problems, the present invention aims at providing an oxygen concentration detection apparatus which is capable of starting feedback control of an air-fuel ratio in the shortest possible time after engine starting, which can prevent the blackening of an oxygen concentration sensor, incorrect determination of the air-fuel ratio immediately after current supply to a heating element has been started, and damage to the oxygen concentration sensor caused by a temperature rise of the heating element when the engine is cold started.

To these ends, according to one aspect of the invention, there is provided an oxygen concentration detection apparatus for an internal combustion engine comprising: an oxygen concentration sensor having a pair of oxygen ion conductivity solid electrolytic members disposed in exhaust gases of the internal combustion engine, with one of the solid electrolytic members functioning as an oxygen pumping device and the other member functioning as an oxygen concentration measuring battery element; heating means for heating the oxygen concentration sensor and generating heat in accordance with the magnitude of a current supplied from a power supply to the heating means; heating state detecting means for detecting the heating state of the heating means and generating a corresponding output; and control means for starting current supply to the oxygen pumping device based on the output of the heating state detecting means.

In a preferred form of the invention, the heating means is a variable resistance-type heating element, and the heating state detecting means detects the resistance of the variable resistance-type heating element and estimates the temperature of the variable resistance-type heating element based on the detected resistance thereof.

In a preferred form of the invention, the control means allows current supply to the oxygen pumping device to be started after the resistance of the variable resistance-type heating element detected by the heating state detecting means has become equal to or greater than a first predetermined value.

In a preferred form of the invention, the control means allows current supply to the oxygen pumping device to be started after a predetermined length of time has elapsed from the time the resistance of the variable resistance-type heating element detected by the heating state detecting means has become equal to or greater than the first predetermined value.

In a preferred form of the invention, the control means determines that a failure has occurred in the variable resistance-type heating element when the resistance of the variable resistance-type heating element detected by the heating state detecting means becomes less than a second predetermined value which is smaller than the first predetermined value after the resistance of the variable resistance-type heating element has become greater than the first predetermined value.

In a preferred form of the invention, the control means determines that a failure has occurred in the heating means when the output of the heating state detecting means does not change even when the heating means is operated.

In a preferred form of the invention, the control means, in accordance with the detected value of the heating state detecting means, controls the current supplied to the variable resistance-type heating element and controls the temperature-rising characteristic of the variable resistance-type heating element during warming-up thereof.

In a preferred form of the invention, a corrective resistor is provided for correcting a variation in resistance of the variable resistance-type heating means, and the control means determines the heating state of the variable resistance-type heating element based on the resistance of the variable resistance-type heating element and the resistance of the corrective resistor.

DESCRIPTION OF THE PREFERRED EMBODIMENTS

An embodiment of the present invention will be described below in detail while referring to the accompanying drawings.

Figure 1:
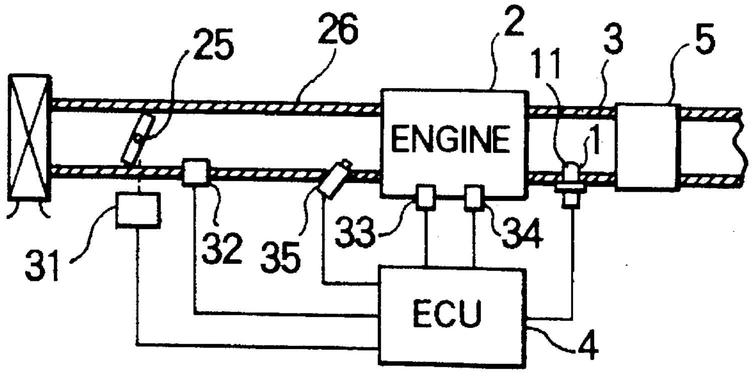
FIG. 1 is a schematic view illustrating an electronically controlled fuel injection system for an internal combustion engine equipped with an oxygen concentration detection apparatus of the present invention.

FIG. 1 illustrates the overall arrangement of an electronically controlled fuel injection system for an internal combustion engine equipped with an oxygen concentration detection apparatus which is constructed in accordance with the principles of the present invention. In FIG. 1, an oxygen concentration sensor 1 is mounted on an exhaust pipe 3 of the engine 2 at the upstream side of a ternary catalytic converter 5 connected to the exhaust pipe 3 for detecting an oxygen concentration in an exhaust gas discharged from the engine 2. The input/output terminal of the oxygen concentration sensor 1 is connected to an electronic control unit 4 ("hereinafter referred to an ECU") which controls the fuel injection system.

Figure 2:
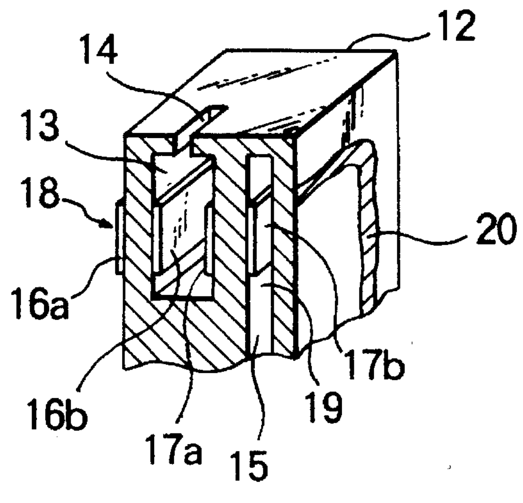
FIG. 2 illustrates the interior of an oxygen concentration sensor of the apparatus of FIG. 1.

FIG. 2 partially illustrates details of the oxygen concentration sensor 3. As shown in FIG. 2, a generally rectangular parallelopiped oxygen ion conductivity solid electrolytic member 12 is provided in a protective case of the oxygen concentration sensor 1, with a gas chamber 13 formed in the oxygen ion conductivity solid electrolytic member 12. The gas chamber 13 communicates with an introducing hole 14 for introducing the exhaust gas to be measured from the exhaust pipe 3. The introducing hole 14 is provided in the wall of the exhaust tube 3 where it is easy for the exhaust gas to flow into the gas chamber 13. An atmospheric air chamber 15 oxygen ion conductivity solid electrolytic member 12 is defined in the oxygen ion conductivity solid electrolytic member 12 for introducing atmospheric air thereinto and it is separated by a partition wall from the gas chamber 13. The partition wall between the gas chamber 13 and the atmospheric chamber 15 is provided on its opposite sides with a pair of electrodes 17*a* and 17*b*, while a wall section of the atmospheric chamber 15 opposing to the partition wall is provided on its opposite sides with a pair of electrodes 16*a* and 16*b*. The oxygen ion conductivity solid electrolytic member 12 and the pair of electrodes 16*a* and 16*b* cooperate to function as an oxygen pumping device 18, while the oxygen ion conductivity solid electrolytic member 12 and the pair of electrodes 17*a* and 17*b* cooperate to function as an oxygen concentration ratio measuring battery element 19. Further, the outer wall surface of the atmospheric air chamber 15 has a heating means in the form of a resistance-type heating element 20. Zirconium dioxide is used for the oxygen ion conductivity solid electrolytic member 12, while platinum is used for the electrodes 16*a* and 16*b*, and 17*a* and 17*b*.

Figure 3:
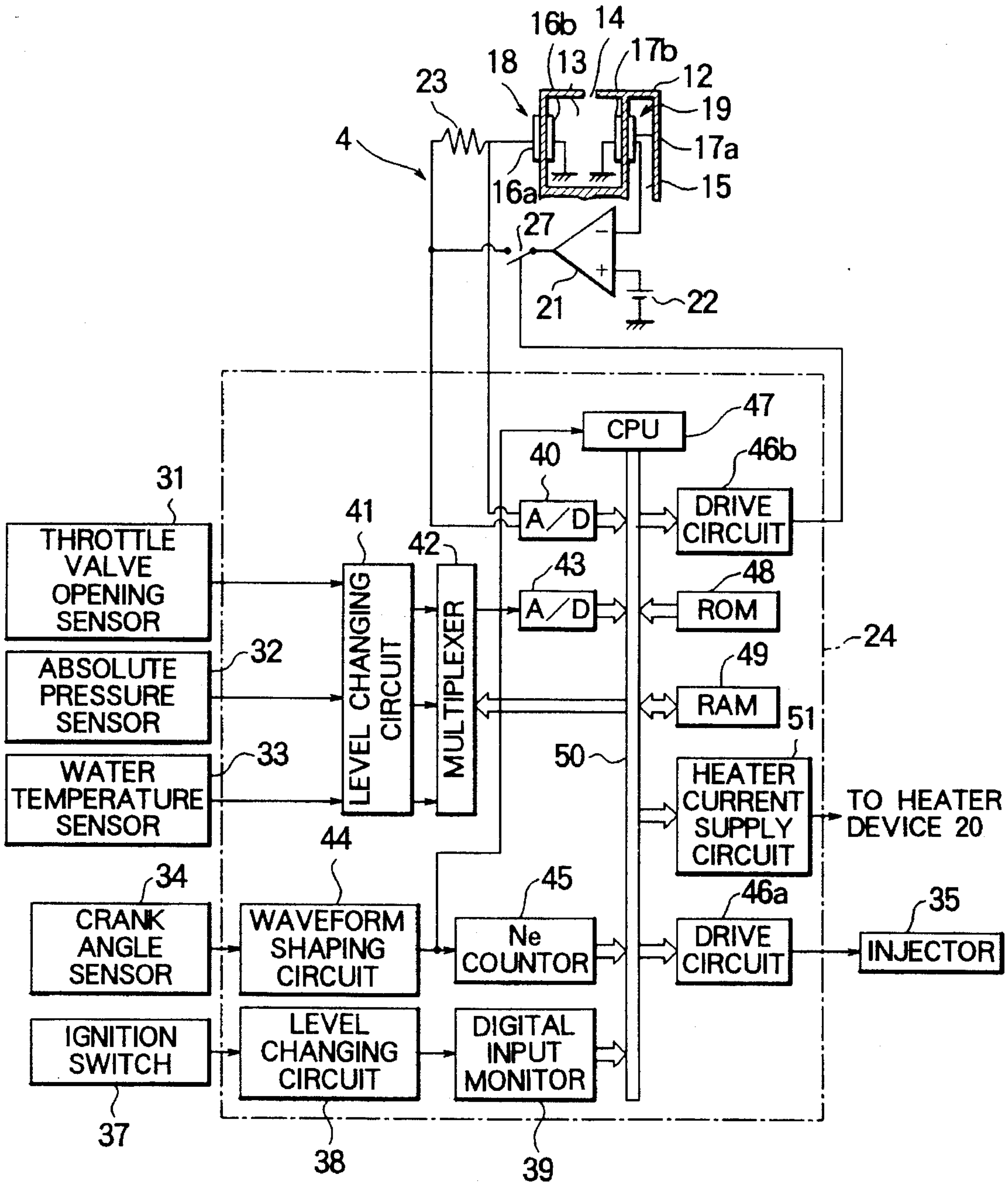
FIG. 3 illustrates a circuit diagram of an electronic control unit of the apparatus of FIG. 1.

FIG. 3 diagrammatically illustrates the construction of the ECU 4. As shown in FIG. 3, the ECU 4 comprises a differential amplification circuit 21, a reference voltage source 22, a current detecting resistor 23, and a switch 27 which together form an oxygen concentration sensor control section. The electrode 16*b* of the oxygen pumping device 18 and the electrode 17*b* of the battery element are connected to ground. The electrode 17*a* of the battery element 19 is connected to the differential amplification circuit 21, which outputs a voltage based on the difference in voltage developed between the pair of electrodes 17*a* and 17*b* of the battery element 19 and the output voltage of the reference voltage source 22. The output voltage of the reference voltage source 22 is a voltage corresponding to the stoichiometric air-fuel ratio (for example, 0.4 V). The output end of the differential amplification circuit 21 is connected to the electrode 16*a* of the oxygen pump element 18 through the switch 27 and the current detecting resistor 23. Both ends of the current detecting resistor 23 serve as output ends of the oxygen concentration sensor 1 and are connected to a control circuit 24 in the form of a microcomputer. The following components are connected to the control circuit 24. These components include a throttle valve opening sensor 31 in the form of a potentiometer for producing an output voltage level in accordance with the opening of a throttle valve 25 (see FIG. 1), an absolute pressure sensor 32 which is mounted on an intake pipe 26 at the downstream side of the throttle valve 25 and develops an output voltage level in accordance with the absolute pressure in the intake pipe 26, a water temperature sensor 33 for generating an output voltage level in accordance with the temperature of engine cooling water, a crank angle sensor 34 for generating a pulse signal in synchronization with the rotation of the crankshaft of the engine 2, an ignition switch 37 for supplying the battery output voltage to the control circuit 24 when the automobile is in operation, and an injector 35 mounted to the intake pipe 26 at a location near an unillustrated intake valve of the engine 2 for injecting an amount of fuel into the intake pipe 26.

The control circuit 24 comprises an A/D converter 40 for converting a differential voltage across the current detecting resistor 23 into a digital signal, a level changing circuit 41 for changing the output level of each of the throttle valve opening sensor 31, the absolute pressure sensor 32 and the water temperature sensor 33, a multiplexer 42 for selectively outputting one of the outputs of the sensors 31, 32, 33 which has passed through the level changing circuit 41, an A/D converter 43 for converting the signal output from the multiplexer 42 into a digital signal, a waveform shaping circuit 44 for shaping the waveform of the output signal of the crank angle sensor 34 and outputting the resultant signal as a TDC signal, a counter 45 for computing the intervals, at which the TDC signals are produced from the waveform shaping circuit 44, based on the number of clock pulses output from an unillustrated clock pulse developing circuit, a level changing circuit 38 for changing the output level of the ignition switch 37, a digital input modulator 39 for modulating the switch output which has passed through the level changing circuit 38 into digital data, a first drive circuit 46*a* for driving the injector 35, a second drive circuit 46*b* for turning on the switch 27, a CPU 47 for performing digital computations in accordance with a control program(s), ROM 48, and a ROM 49 for storing various processing programs and data. The A/D converters 40 and 43, multiplexer 42, counter 45, digital input modulator 39, drive circuits 46*a* and 46*b*, CPU 47, and ROM 48 and ROM 49 are connected to one another by means of an input/output bus 50. A TDC signal is directly supplied from the waveform shaping circuit 44 to the CPU 47. In addition, a heater current supplying circuit 51 is provided in the control circuit 24 for supplying current to the resistance-type heating element 20.

In such an electronic control fuel injector, the following information are supplied to the CPU 47 via the input/output bus 50. They are information regarding a pump current value lp input from the A/D converter 40 (the current flows through the oxygen pump element 18), a throttle valve opening θth and an absolute intake pressure Pba which are alternatively selected from the A/D converter 43, and information regarding the number of rotations Ne per unit time of the engine counted by the counter 45 as well as on/off of the ignition switch 37 generated by the digital input modulator 39. The CPU 47 reads in each of the aforementioned information in accordance with a computation program stored in ROM 48. Based on these types of information, in synchronization with the TDC signal, the fuel injection time Tout of the injector 35 which corresponds to the amount of fuel to be supplied to the engine 2 is computed from a predetermined formula of the fuel supply routine. The drive circuit 46*a* drives the injector 35 for the fuel injection time Tout to supply fuel to the engine 2. The fuel injection time Tout is computed from the following formula:

$$Tout = Ti \times Ko2 \times Kwot \times Ktw \quad (1)$$

wherein Ti represents a basic fuel supply amount which indicates a basic injection time determined by a known method from the number of rotations Ne per unit time of the engine and the absolute pressure Pba in the intake pipe; Ko2 represents a feedback correction factor for the air-fuel ratio which is set in accordance with the output level of the oxygen concentration sensor; Kwot represents a fuel correction factor for correcting the basic fuel supply amount in accordance with the engine load; and Ktw represents a cooling water temperature coefficient. These values are set in accordance with a subroutine of the fuel supply routine.

On the other hand, the drive circuit 46*b* turns on the switch 27 in accordance with a "turn on" command from the CPU 47, and turns off the switch 27 to stop the driving in accordance with a "turn off" command. When the switch 27 is turned on, a pumping current starts to flow between the pair of electrodes 16*a* and 16*b* of the oxygen pump element 18 through the current detecting resistor 23. Upon supplying pumping current to the oxygen pumping device 18, when the air-fuel ratio of a mixture supplied to the engine 2 is within a lean region (i.e., leaner than the stoichiometric value), the voltage developed between the pair of electrodes 17*a* and 17*b* of the battery element 19 is lower than the output voltage of the reference voltage source 22. Therefore, the output level of the differential amplifying circuit 21 is positive, and this positive level voltage is supplied to the parallel circuit of the current detecting resistor 23 and the oxygen pumping device 18. In the case of the oxygen pumping device 18, the pump current flows from the electrode 16*a* toward the electrode 16*b*, which causes the oxygen in the gas chamber 13 to be ionized at the electrode 16*b*. The ionized oxygen moves through the oxygen pumping device 18 and is discharged from the electrode 16*a* as oxygen gas, whereby the oxygen in the chamber is pumped out. Pumping out the oxygen in the gas chamber 13 produces a difference in oxygen concentration between the exhaust gas in the gas chamber 13 and the atmospheric air in the atmospheric chamber 15. This develops a voltage Vs between the pair of electrodes 17*a* and 17*b* in accordance with this oxygen concentration difference, which is supplied to the inverting input of the differential amplifying circuit 21. The output voltage of the differential amplifying circuit 21 is proportional to the pressure difference between the voltage Vs and the output voltage of the reference voltage source 22. Therefore, the pump current value is proportional to the oxygen concentration in the exhaust gas and is output as a voltage across the current detecting resistor 23.

Figure 4:
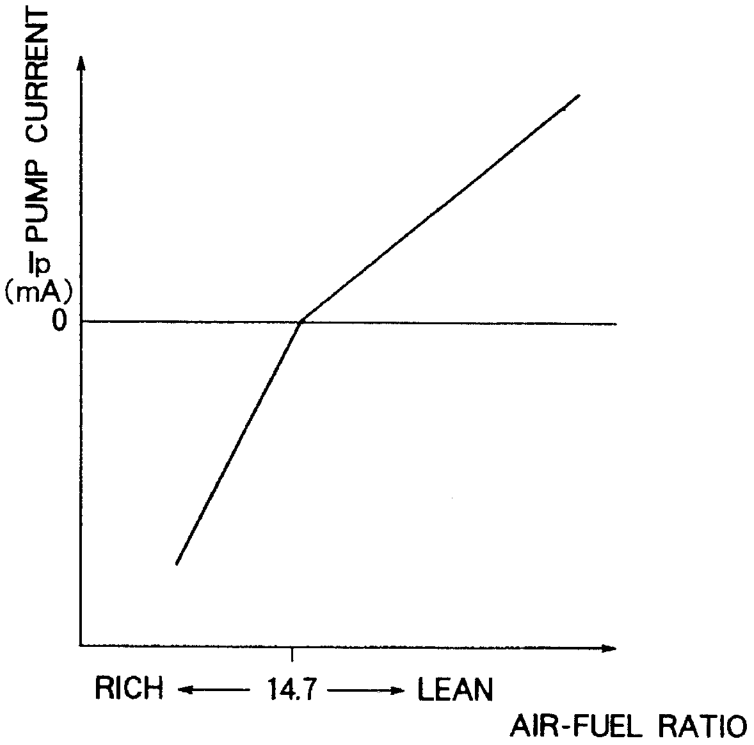
FIG. 4 is a graph of an output characteristic of the oxygen concentration sensor.

When the air-fuel ratio of the mixture to be supplied to the engine 2 is within a rich region (i.e., richer than the stoichiometric value), the voltage Vs exceeds the output voltage of the reference voltage source 22. Therefore, the output level of the differential amplification circuit 21 is inverted from the positive level to the negative level. This level inversion decreases the pump current flowing between the pair of electrodes 16*a* and 16*b* of the oxygen pumping device 18 and reverses the direction of current flow. That is, with the pump current flowing from the electrode 16*b* toward the electrode 16*a*, the oxygen in the atmospheric air is ionized at the electrode 16*a* and the ionized oxygen moves through the oxygen pumping device 18, after which it is discharged and thus pumped into the gas chamber 13 as an oxygen gas. As described above, oxygen is pumped in and out by supplying a pump current such that the oxygen concentration in the air chamber 13 is always held constant. Therefore, as shown in FIG. 4, the pump current value lp is proportional to the oxygen concentration in the exhaust gas in both the lean region and the rich region. In addition, the aforementioned feedback correcting factor Ko2 is set in accordance with the pump current value lp.

Figure 5:
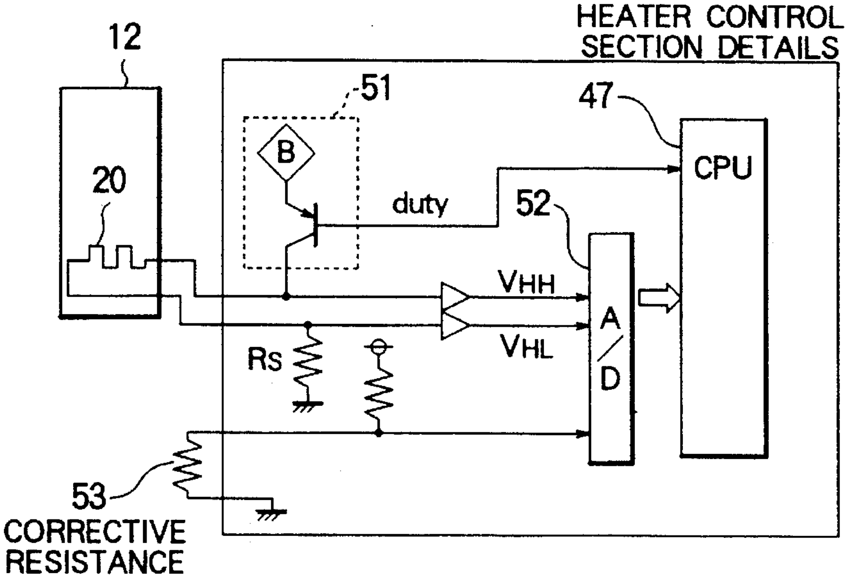
FIG. 5 is a block diagram of a heater controller of the present invention.

FIG. 5 illustrates a heater control section in detail. Referring to this figure, the heater current supply circuit 51 supplies current to the resistance-type heating element 20 in accordance with a duty signal generated by the CPU 47. When the duty signal is present, that is when current is supplied to the heating element 20, the voltage across the heating element 20 is read by the A/D converter 52. This voltage and the reference resistance Rs allow detection of the resistance of the heating element. If the duty signal is always present, for example, for 10 msec per a total time of 100 msec, the resistance of the heating element 20 can be detected substantially in real time. In addition, to accommodate for variations in the resistance value of the heating element 20, a resistance value of a corrective resistor 53, which is inserted into a connector of the oxygen concentration sensor, is also read in by the A/D converter 52.

Figure 6:
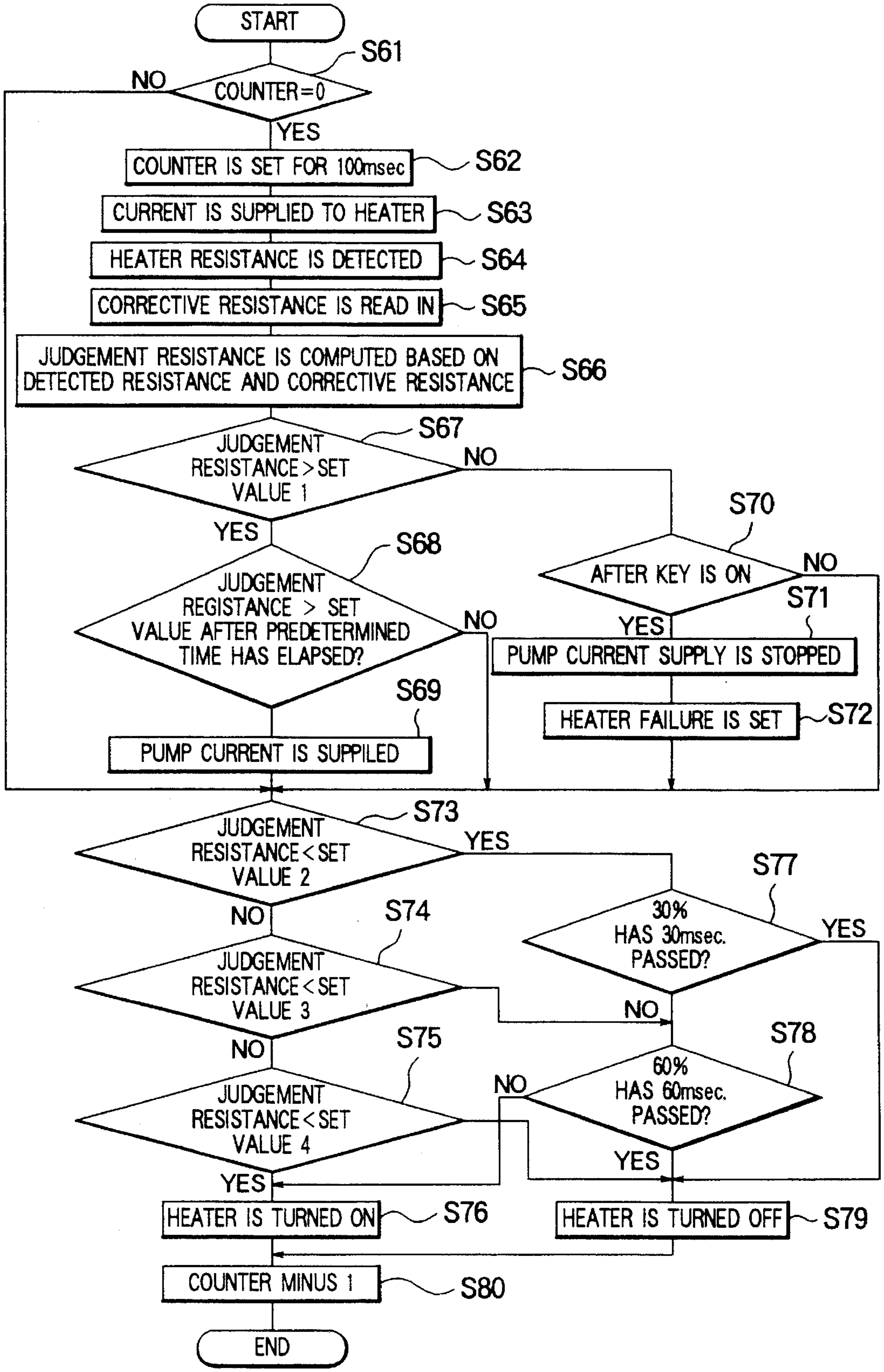
FIG. 6 is a flowchart illustrating the operation of the apparatus of FIG. 1.

Next, the operation of the oxygen concentration detection apparatus of the invention will be described with reference to FIG. 6 which is a flowchart illustrating the operation of the CPU 47. Referring to this figure, each process is performed every 100 msec based on the time control by the CPU 47. Upon starting the process, first in Step S61, the counter value stored in the RAM 49 is checked as to whether it is zero. This is performed to determine whether or not to detect the resistance of the heating element 20 every 100 msec. If the counter value is not zero, detection of the resistance of the heating element 20 is not performed, and the process proceeds to Step S73. If the counter value is zero, this means that 100 msec has elapsed. Therefore, the process proceeds to the next Step S62 in which, first, the counter value is set to detect for the next 100 msec. Upon generation of a duty signal command by the CPU 47, current is supplied to the heating element 20 from the heater current supply circuit 51 in Step S63. Then, based on the voltage across the heating element 20 and the reference resistance Rs, the resistance of the heating element 20 is detected in Step S64. The resistance of the heating element 20 is obtained by the following formula:

$$\text{Resistance of heating element}=(VHH-VHL)/(VHL/Rs) \quad (2)$$

wherein VHH and VHL represent a higher terminal voltage and a lower terminal voltage, respectively, of the heating element 20.

Figure 7:
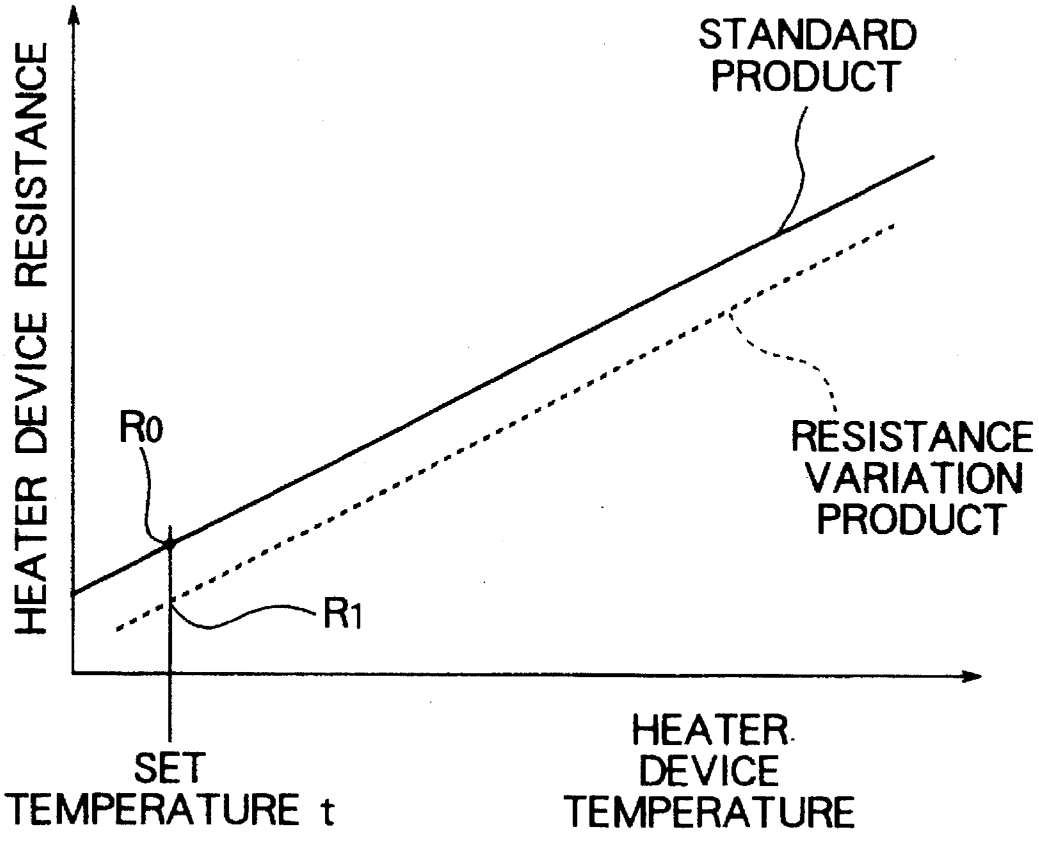
FIG. 7 is a graph of a temperature characteristic of a heater resistor of the apparatus of FIG. 1.

As shown in FIG. 7, in the manufacturing process, a variation in the resistance of the heating element 20 occurs. However, since the temperature characteristic of the heating element 20 can be considered as being substantially the same, as shown in FIG. 7, there may be provided a corrective resistance having a value equivalent to a variation between the resistance R1 of the resistance-type heating element 20 and the resistance R0 of the standard sensor product at a predetermined temperature t, namely R0–R1, to reduce the effects of variation in resistance of the heating element 20. Accordingly, the resistance value of the corrective resistor 53 is read in by the A/D converter 52 in Step S65, and the resistance of the corrective resistor 53 read in Step S65 is either added to or subtracted from the resistance of the heating element 20 detected in Step S64 (for example, when R0>R1, it is added whereas when R0<R1, it is subtracted). In this manner, the variation in the resistance value of the heating element 20 can be corrected so that a corrected or judgment resistance value corresponding exactly to R0 is computed in Step S66. Thereafter, the process proceeds to Step S67 in which the corrected resistance value is compared with a first set value which is a resistance value corresponding to a predetermined temperature, for example 550° C., at which blackening of the sensor 1 will not occur even immediately after current supply to the pumping device 18 has been started. When the corrected resistance is larger than the first set resistance value, the process proceeds to Step S68 because the heating element 20 has a temperature higher than the predetermined temperature. A determination is made as to whether a predetermined time has elapsed after the temperature of the heating element 20 has risen above the predetermined temperature. This is done to provide time for heat transfer from the heating element 20 to the oxygen pumping device 18. Instead of providing time, the first set value in Step S67 may be a little higher value, for example 600° C.

If the aforementioned predetermined time has elapsed, current supply to the pumping device is started in Step S69. If the predetermined time has not elapsed, the process proceeds to Step S73. If in Step S67 the corrected resistance is not larger than the first set value, the process proceeds to Step S70 in which it is determined whether or not current has been supplied to the pumping device 18 up to this time. If it has been supplied, a determination is made that the temperature of the heating element 20 has dropped, for some reason, to a temperature at which blackening can occur. This stops the current supply to the pumping device 18 in Step S71, and a failure flag of the heating element 20 is set in Step S72 to proceed to the next step. If current has not been supplied to the pumping device 18 in Step S70, it is determined that after current has been supplied to the heating element 20, the temperature of the heating element 20 does not exceed a predetermined value at which current supply to the pumping device 18 can be started without causing damage thereto. Then, the process proceeds to Step S73.

Control operation of the heating element 20 is carried out in Step S73 and onwards. A determination is made as to whether or not the corrected resistance value is greater than a second set value in Step S73. Here, the second set value and a third set value to be described later are used for the purpose of preventing the heating element 20 from being broken by thermal shock, which is achieved by appropriately limiting the electric power supplied to the heating element 20 to raise the temperature of the heating element 20 slowly to the predetermined value (for example, 200° C. or 400 ° C.). If it has been determined in Step S73 that the corrected resistance value is larger than the second set value, this value is compared with a third set value in Step S74. If this value is greater than the third set value in Step S75, the process proceeds to the next step. If it is not greater, the process proceeds to Step S78. When the corrected resistance value is smaller than the second set value in Step S73, a determination is made that current supply to the heating element 20 has just been started. Thus, the power supply to the heating element 20 is limited to a 30% duty and whether or not the counter value is within 30 msec is checked in Step S77. If it is within 30 msec, the counter value is obviously judged as being within 60 msec in Step S78 so that the heating element 20 is turned on in Step S76. On the other hand, if the counter value is greater than 30 msec in Step S77, the process proceeds to Step S79 in which the heating element 20 is turned off to limit the supply power to the 30% duty. In the same way, if the counter value is within 60 msec even in Step S78, the heating element 20 is turned on in Step S76, whereas if it is greater than 60 msec, the heating element 20 is turned off in Step S79 to limit the supply power to a 60% duty. In this way, heat shock of the pumping device 18 upon heating of the heating element 20 is prevented.

Step S78 is provided for controlling to a desired temperature the heating element 20 which has entered its stable heating period. If it is determined in Step S74 that the warming-up of the heating element 20 has been completed, the process proceeds to Step S75 in which the corrected resistance value and a fourth set value are compared. Here, the fourth set value is a resistance value which corresponds to a desired heating element temperature (for example, 750° C.). If the corrected resistance value is greater than the fourth set value, the heating element 20 is turned off in Step S79, whereas if it is smaller, the heating element 20 is turned on in Step S76 to control the heating element 20 to the desired temperature. In this operation, duty control of the heating element 20 is carried out every 100 msec at which the processing shown in the flowchart of FIG. 6 is executed. As can be seen from the foregoing, the ECU 4 and its processing program constitutes the heating state detecting means of the present invention.

In the above-described embodiment, the corrected resistance value of the heating element 20, obtained by correcting the detected heating element resistance value by the correction resistance value, has been compared with the first through fourth set values. However, the first through fourth set values, each of which has been corrected by the deviation between R0 and R1, can be compared with the resistance of the heating device 20 detected.

What is claimed is:

1. An oxygen concentration detecting apparatus for an internal combustion engine comprising:

an oxygen concentration sensor having a pair of oxygen ion conductivity solid electrolytic members disposed in an exhaust gas of the internal combustion engine, with one of said solid electrolytic members functioning as an oxygen pumping device and the other member functioning as an oxygen concentration measuring battery element;

a variable resistance heating element for heating said oxygen concentration sensor and generating heat in accordance with the magnitude of a current supplied from a power supply to said heating element;

a corrective resistor for correcting a variation in resistance of said variable resistance heating element;

heating state detecting means for detecting a heating state of said variable resistance heating element and generating a corresponding output; and control means for starting current supply to said oxygen pumping device based on the output of said heating state detecting means, wherein said control means determines the heating state of said variable resistance heating element based on the resistance of said variable resistance heating element and the resistance of said corrective resistor.

2. An oxygen concentration detector according to claim 1, wherein said heating state detecting means is adapted for detecting the resistance of said variable resistance heating element and for estimating the temperature of said variable resistance heating element based on the detected resistance thereof.

3. An oxygen concentration detector according to claim 2, wherein said control means is adapted to allow current supply to said oxygen pumping device to be started after the resistance of said variable resistance heating element detected by said heating state detecting means has become equal to or greater than a first predetermined value.

4. An oxygen concentration detector according to claim 3, wherein said control means is adapted to allow current supply to said oxygen pumping device to be started after a predetermined length of time has elapsed from the time the resistance of said variable resistance heating element detected by said heating state detecting means has become equal to or greater than the first predetermined value.

5. An oxygen concentration detecting apparatus for an internal combustion engine comprising:

an oxygen concentration sensor having a pair of oxygen ion conductivity solid electrolytic members disposed in an exhaust gas of the internal combustion engine, with one of said solid electrolytic members functioning as an oxygen pumping device and the other member functioning as an oxygen concentration measuring battery element;

a variable resistance heating element for heating said oxygen concentration sensor and generating heat in accordance with the magnitude of a current supplied from a power supply to said heating element;

heating state detecting means for detecting a resistance of said variable resistance heating element and generating a corresponding output;

control means adapted to allow current supply to said oxygen pumping device to be started after a predetermined length of time has elapsed from the time the resistance of said variable resistance heating element detected by said heating state detecting means has become equal to or greater than a first predetermined value for starting current supply to said oxygen pumping device based on the output of said heating state detecting means; and wherein said control means is further adapted to determine that a failure has occurred in said variable resistance heating element when the resistance of said variable resistance heating element detected by said heating state detecting means becomes less than a second predetermined value which is smaller than the first predetermined value after the resistance of said variable resistance heating element has become greater than the first predetermined value.

6. An oxygen concentration detector according to claim 2, wherein said control means, in accordance with the detected value of said heating state detecting means, is adapted to control the current supplied to said variable resistance heating element so as to adjust a temperature-rising characteristic of said variable resistance heating element during warming-up thereof.

7. An oxygen concentration detector according to claim 1, wherein said control means is adapted to determine that a failure has occurred in said heating element when the output of said heating state detecting means does not change even when said heating element is operated.

* * * * *